(12) United States Patent
Domschot

(10) Patent No.: US 6,271,496 B1
(45) Date of Patent: Aug. 7, 2001

(54) MODULAR WELDING MACHINE

(76) Inventor: Bryan W. Domschot, 11347 Berry Rd., Blissfield, MI (US) 49228

( * ) Notice: Subject to any disclaimer, the term of this patent is extended or adjusted under 35 U.S.C. 154(b) by 0 days.

(21) Appl. No.: 09/467,254

(22) Filed: Dec. 20, 1999

(51) Int. Cl.⁷ .................................................. B23K 11/10
(52) U.S. Cl. ........................................... 219/86.8; 219/87
(58) Field of Search ........................ 219/86.8, 87, 86.24, 219/86.25; 901/42

(56) References Cited

U.S. PATENT DOCUMENTS

| | | | |
|---|---|---|---|
| 3,148,264 | * | 9/1964 | Clark, Jr. et al. .................... 219/86.8 |
| 4,473,734 | * | 9/1984 | Henry ................................ 219/86.8 |
| 4,594,494 | * | 6/1986 | Henry et al. ....................... 219/86.8 |
| 4,893,398 | * | 1/1990 | Zimmer ................................ 901/42 |
| 5,093,977 | * | 3/1992 | Muller et al. ..................... 219/86.24 |
| 6,072,146 | * | 6/2000 | Matuschek et al. ................ 219/86.8 |

\* cited by examiner

Primary Examiner—Clifford C. Shaw
(74) Attorney, Agent, or Firm—Reising, Ethington, Barnes, Kisselle, Learman & McCulloch, P.C.

(57) ABSTRACT

A spot welding machine is disclosed with interchangeable tooling modules for use in a base operating machine. Push/pull welding current contactors connect the tooling module to a transformer on the base operating machine when the module is installed. The module is movable on a guide between uninstalled and installed locations and closes the contactors upon installation of the module. A set of fluid pressure and electrical connector members have complementary mating parts mounted on a module plate and on a machine connector plate of the base operating machine. An actuator moves the machine connector plate from a retracted position to an extended position for connecting the complementary connector members after the module is installed.

30 Claims, 15 Drawing Sheets

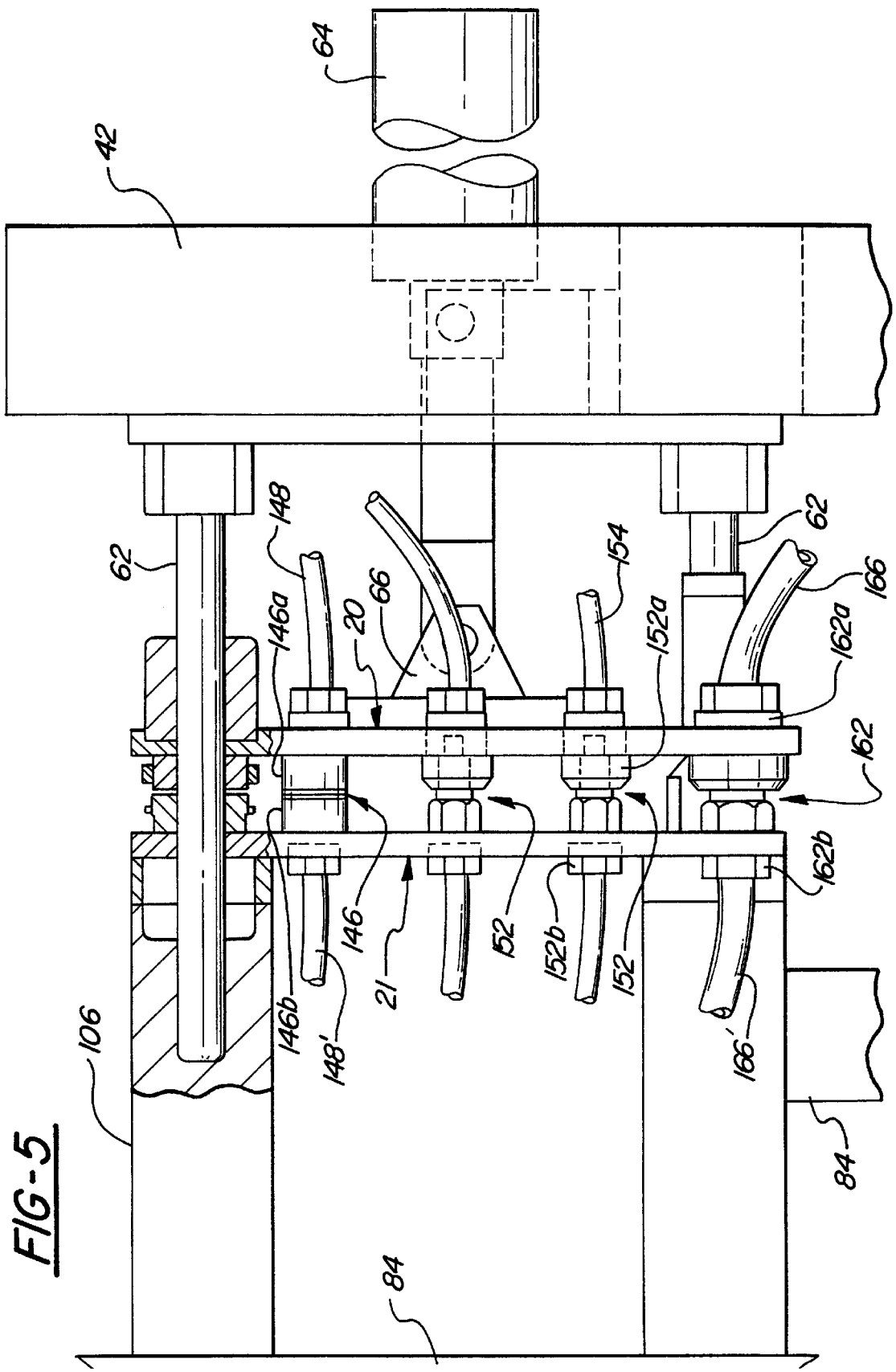

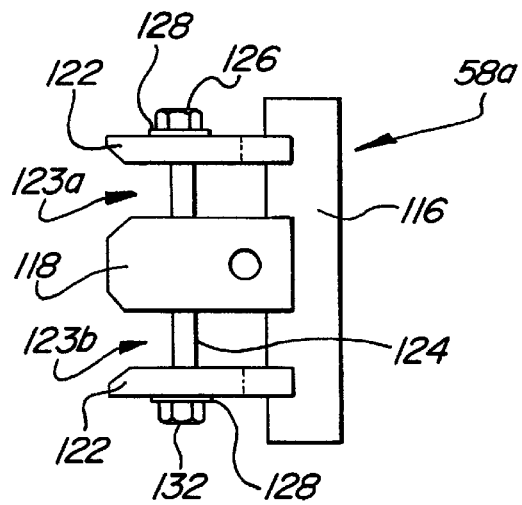
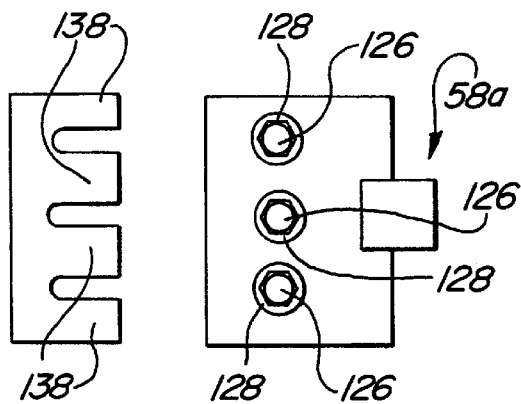
FIG-8
FIG-9
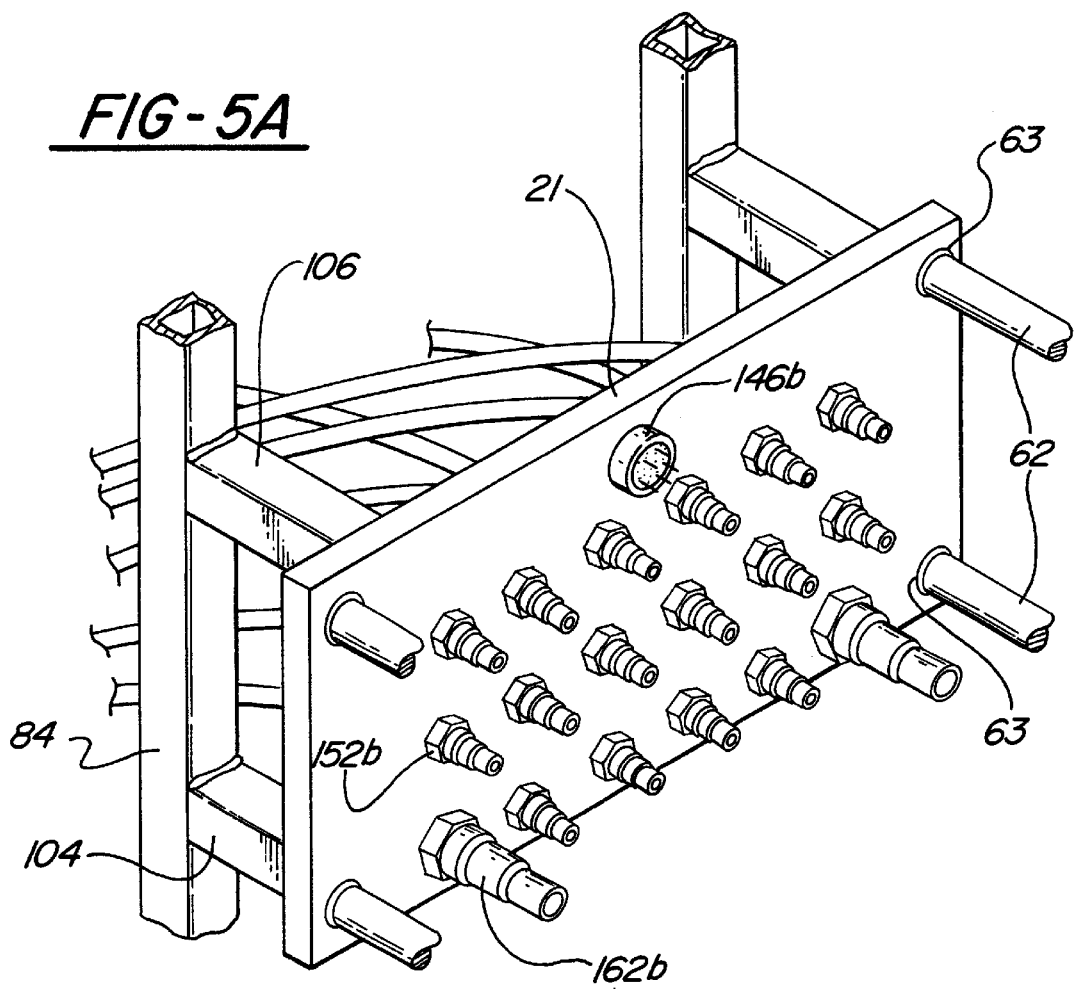
FIG-5A

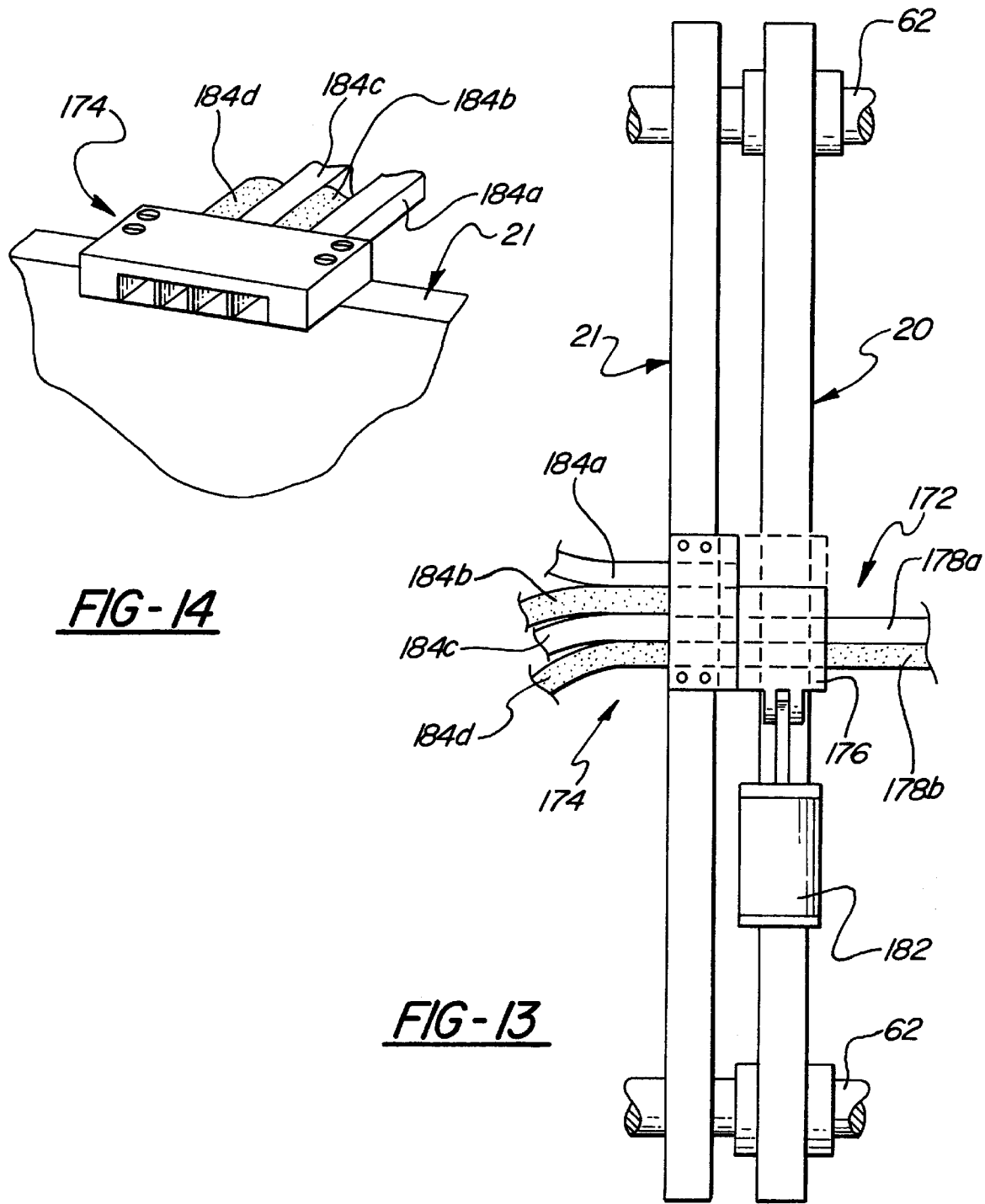

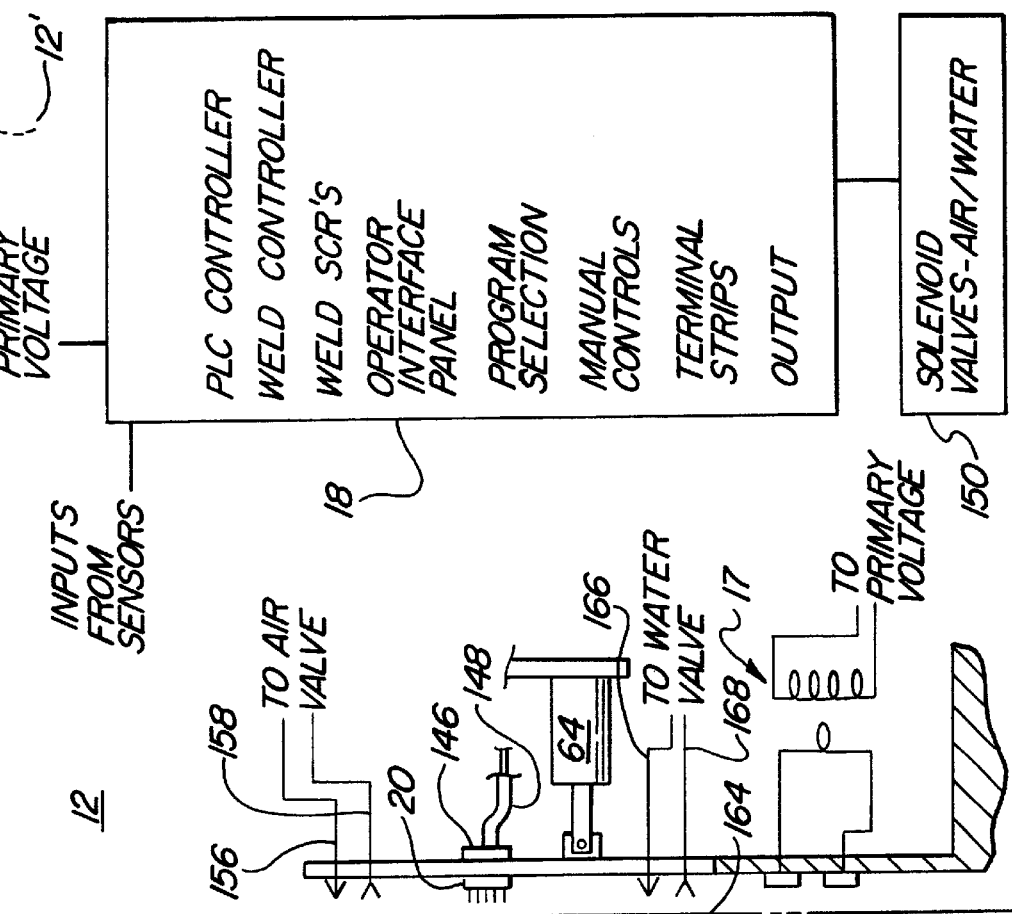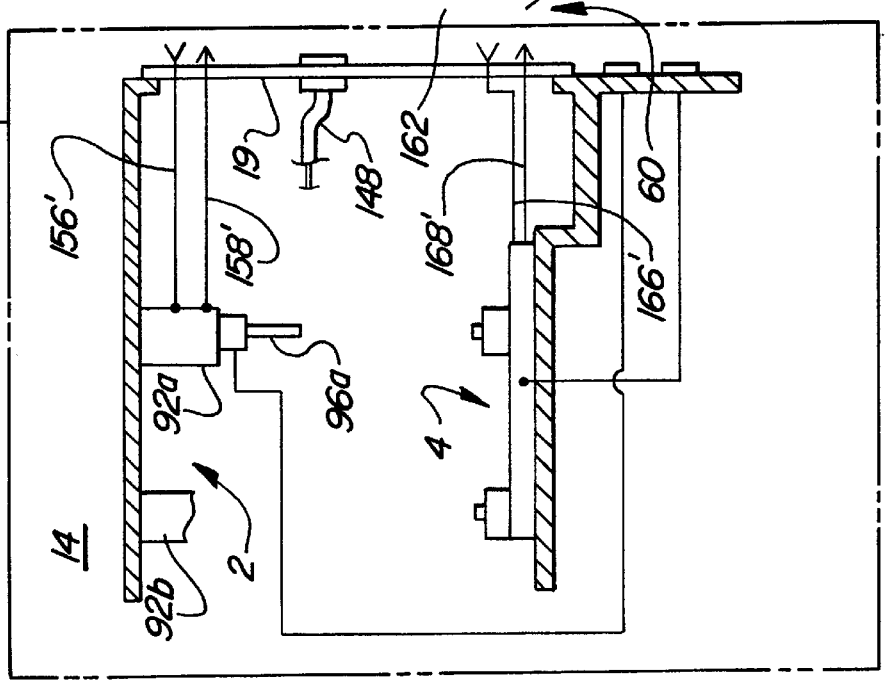
FIG-19

MODULAR WELDING MACHINE

FIELD OF THE INVENTION

This invention relates to welding machines of the type used in manufacturing plants for production of welded parts. More particularly, it relates to electric welding machines such as resistance welders.

BACKGROUND OF THE INVENTION

It has been a common practice in the welding machine industry to build welding machines with custom tooling as an integral part of the welding machine. In this practice, especially in connection with spot welding machines, each machine is dedicated to the manufacture of a particular part and is not useable for manufacture of other parts. The working area of such a dedicated machine includes an attached assembly of fixtures and tools specifically made, located and adjusted to produce the parts to which the machine is dedicated. The entire machine, from heavy frame to built-in precision fixtures is treated as capital equipment on the financial books of the purchaser. When the parts produced by the dedicated machine are no longer needed, the entire machine is generally scrapped.

There has been a longstanding need in the industry to overcome the disadvantages which accompany the practice of using dedicated welding machines such as the economic loss from scrapping the entire machine when the tools and fixtures are no longer usable because of wear and tear or because of termination of production of the part to which the machine is dedicated. A general objective of this invention is to provide a solution to the problem of economic loss associated with dedicated machines by extending the useful life of those parts of the machine which are not dedicated to a particular product. That part of a given machine, except for the dedicated fixtures and tooling, is herein sometimes referred to as the "base operating machine" whereas the dedicated fixtures and tooling are herein referred to as a "tooling module".

In the prior art, the Henry U.S. Pat. Nos. 4,473,734 and 4,594,494 granted Sep. 25, 1984 and Jun. 10, 1986, respectively, describe a base machine which is adapted to receive interchangeable welding modules. These patents describe an arrangement wherein the base machine is provided with a welding head and a foot treadle actuating device for the upper electrode. Welding current is supplied in the base machine through conductors connected to a conductive base member and to the welding head. The welding electrodes receive welding current through a conductive plate on the module and a movable contact in the welding head.

In Muller et al. U.S. Pat. No. 5,093,977 granted Mar. 10, 1992, a welding machine is described which is adapted for processing differently shaped workpieces with a controlled tool changing capability for quick change of the set of tools. In this system, a central work station is provided with a workpiece holder. More than one tool frame is mounted on the machine and each tool frame may be moved from one station to another. When the processing of the workpiece has been completed by a selected tool frame at the central work station, the processed part may be conveyed out of the station. If other processing operations are to be carried out on the same workpiece or if the processing of a workpiece of a different shape is desired, another tool frame is moved into the central work section after the previous tool frame has been moved out. The processing of the workpiece is accomplished by the substituted tool frame.

It is a general object of this invention to provide a modular welding machine which overcomes certain disadvantages of the prior art.

SUMMARY OF THE INVENTION

In accordance with this invention, a modular welding machine comprises a base operating machine which coacts with a removable tooling module which is operatively coupled with the base operating machine to receive welding current, actuator fluid pressure supply and electrical signals through quick disconnect connectors of the push/pull type. Further, according to the invention, movement of the tooling module into its installed position is operative to engage the weld current contactor members on tool module with the contactors on the base operating machine.

Further, according to the invention, a machine connector plate supports a plurality of connector members and a tooling module connector plate supports a plurality of complementary connector members for mating engagement with the connector members on the machine connector plate when the tooling module is situated in the installed position. Preferably, mating engagement is carried out by actuation of the machine connector plate to engage the module connector plate. Preferably, the connector plates carry first and second locating members respectively for aligning said complementary connector members for movement into operative engagement.

Further, in accordance with the invention, the tooling module and the base operating machine are provided with coacting guide means for facilitating movement of the tooling module into or out of the installed position of the module. Preferably, a module transfer cart is provided with alignment means coacting with said base operating machine with guide means on the transfer cart for moving the tooling module onto the guide means of the base operating machine.

Further, in accordance with this invention, interlock means are provided to inhibit operation of the welding machine unless the tooling module is properly installed in the base operating machine.

Further, in accordance with the invention, a parts transfer device may be provided with complementary parts mounted respectively on the machine connector plate and the module connector plate for feeding small parts from the base operating machine to a workpiece positioned on the module.

A complete understanding of this invention may be obtained from the detailed description that follows taken with the accompanying drawings.

DESCRIPTION OF THE DRAWINGS

FIG. 5 is an enlarged view of a portion of FIG. 2;

FIG. 5A is a perspective view of a connector plate;

FIGS. 7, 8, 9, 10, 11 and 12 show details of the electrical contactors for a welding transformer;

FIGS. 13 and 14 depict a parts feeder mounted on the welding machine;

FIG. 19 is a schematic of the electrical and fluid circuits of the welding machine.

BEST MODE FOR CARRYING OUT THE INVENTION

Figure 1:
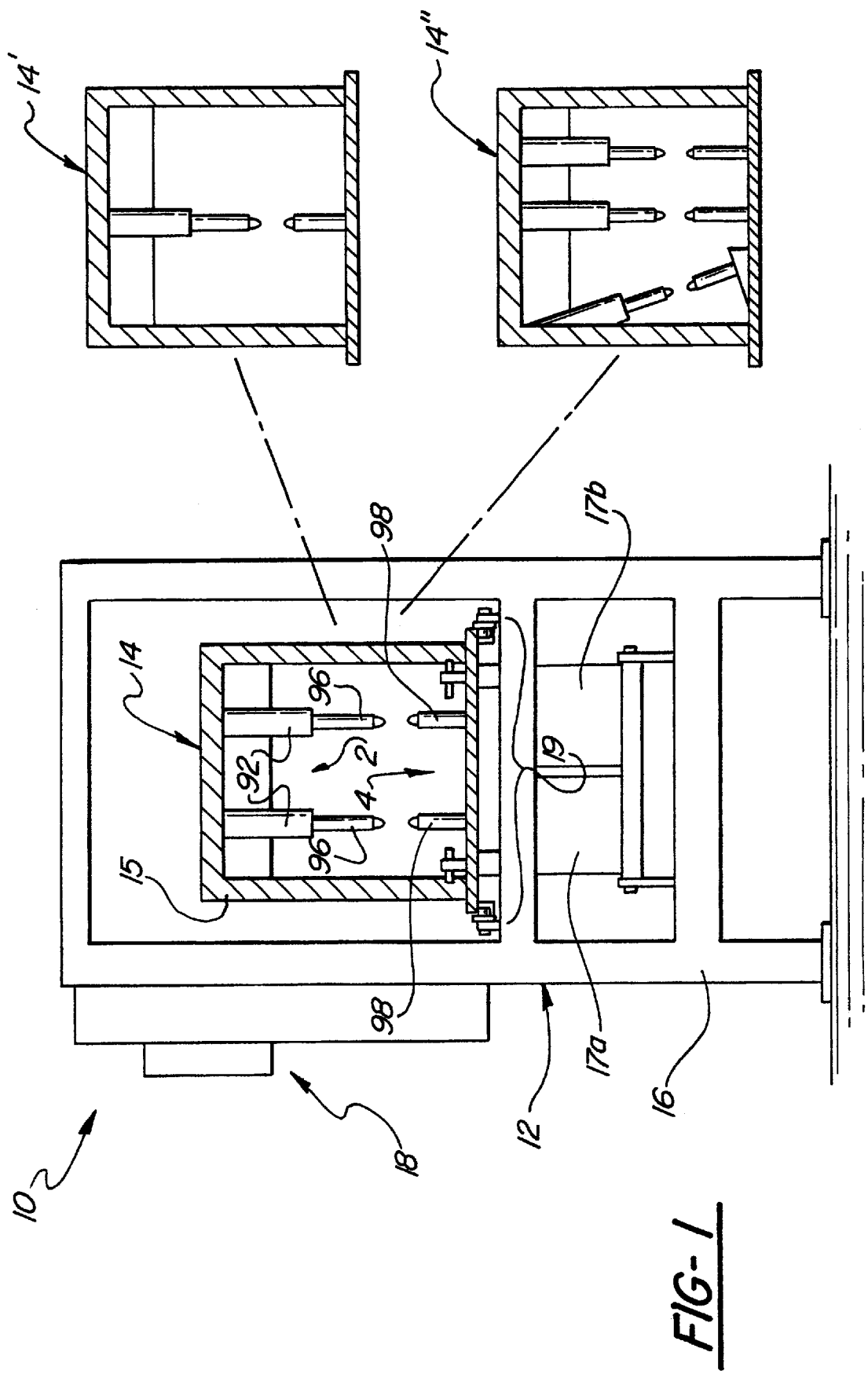
FIG. 1 depicts a welding machine, according to this invention, having a set of tooling modules for use one at a time as a part of the machine.

Referring now to the drawings, there is shown an illustrative embodiment of the invention in a resistance welding machine of the spot welding type which is adapted for volume production of welded parts in a manufacturing plant. It will be appreciated, as the description proceeds, that the invention is useful in a wide variety of applications and may be realized in many different embodiments.

General Description

A modular welding machine according to this invention is illustrated in FIG. 1. The welding machine 10 comprises, in general, a base operating machine 12 and a tooling module 14 installed in the base operating machine. The base operating machine comprises, in general, a machine frame 16, welding transformers 17a, 17b and 17c, a control cabinet 18 and other components which are required for operation of the tooling of the welding machine. The tooling module 14 comprises a module frame 15 which supports the tooling components required for a particular welding job or product which is to be run on the machine. The welding module is installed in the machine as a unit and is removable as a unit as needed for maintenance, repair or for replacement by another tooling module. As shown in FIG. 1, several different tooling modules such as modules 14a, 14b and 14c may be kept in standby condition which are tooled for particular production jobs which may be needed in the future. The base operating machine 12 and the tooling module 14 will be described in greater detail below.

Before proceeding with detailed description of the welding machine 10, an overview of the modular arrangement will be given. The modular welding machine 10 as described with reference to FIG. 1, is a two part machine; the first part is the base operating machine 12 and the second part is the tooling module 14. The tooling module includes the module frame 15 which supports the upper tooling 2 including one or more welding guns 92 and upper electrodes 96. The module frame also supports the lower tooling 4 which includes lower electrodes 98. The upper and lower tooling are disposed in an arrangement for performing welding operations on a particular workpiece. The tooling module also includes special electrical contactors (58b in FIG. 7) for receiving welding current from the base operating machine and a special connector arrangement (module connector plate 21, FIG. 2) for fluid pressure and electrical communication with the base operating machine. The tooling module is adapted for a specific job only. The base operating machine 12 of the welding machine 10 includes a machine frame 16 with a module support rack 19. The base operating machine includes special electrical contactors (58a in FIG. 7) which mate with those of the module for supplying welding current to the electrodes and a special connector arrangement (machine connector plate 20, FIG. 2) which mates with that of the module for supplying fluid pressure and electrical signals to and from the module.

Figure 2:
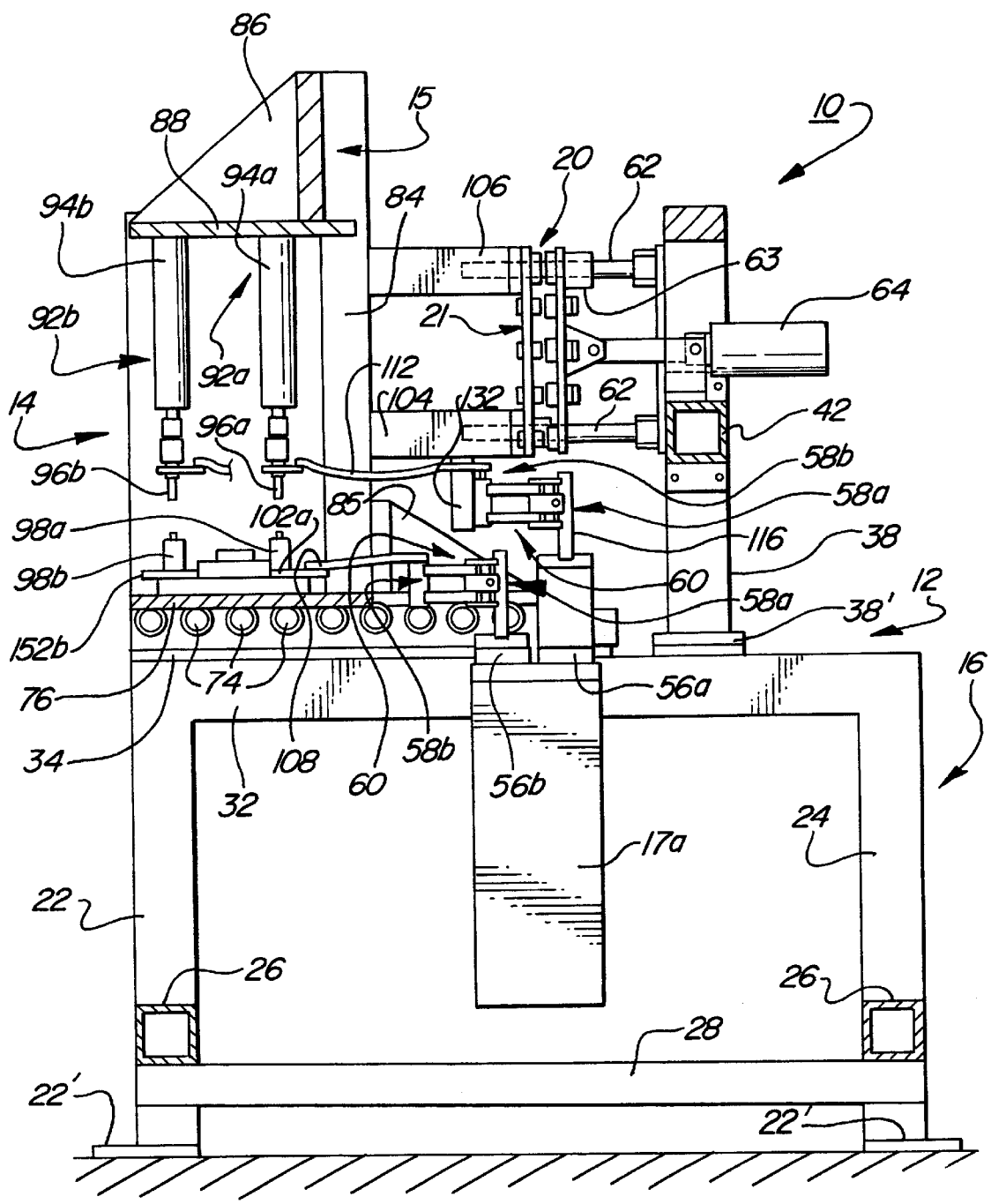
FIG. 2 is a side elevation view of the welding machine of this invention.

FIG. 2 shows the welding machine 10 with the tooling module 14 installed in the base operating machine 12. The machine frame 16 comprises a table structure including front legs 22 with shoe plates 22', rear legs 24, cross beams 26, front to rear longitudinal beams 28 and upper longitudinal beams 32. A table plate 34 is supported on the upper longitudinal beams 32. A pair of oppositely disposed rear posts 38 extend upwardly from bolt plates 38' mounted on the longitudinal beams 32. A support beam 42 extends transversely of the frame between posts 36.

Figure 4:
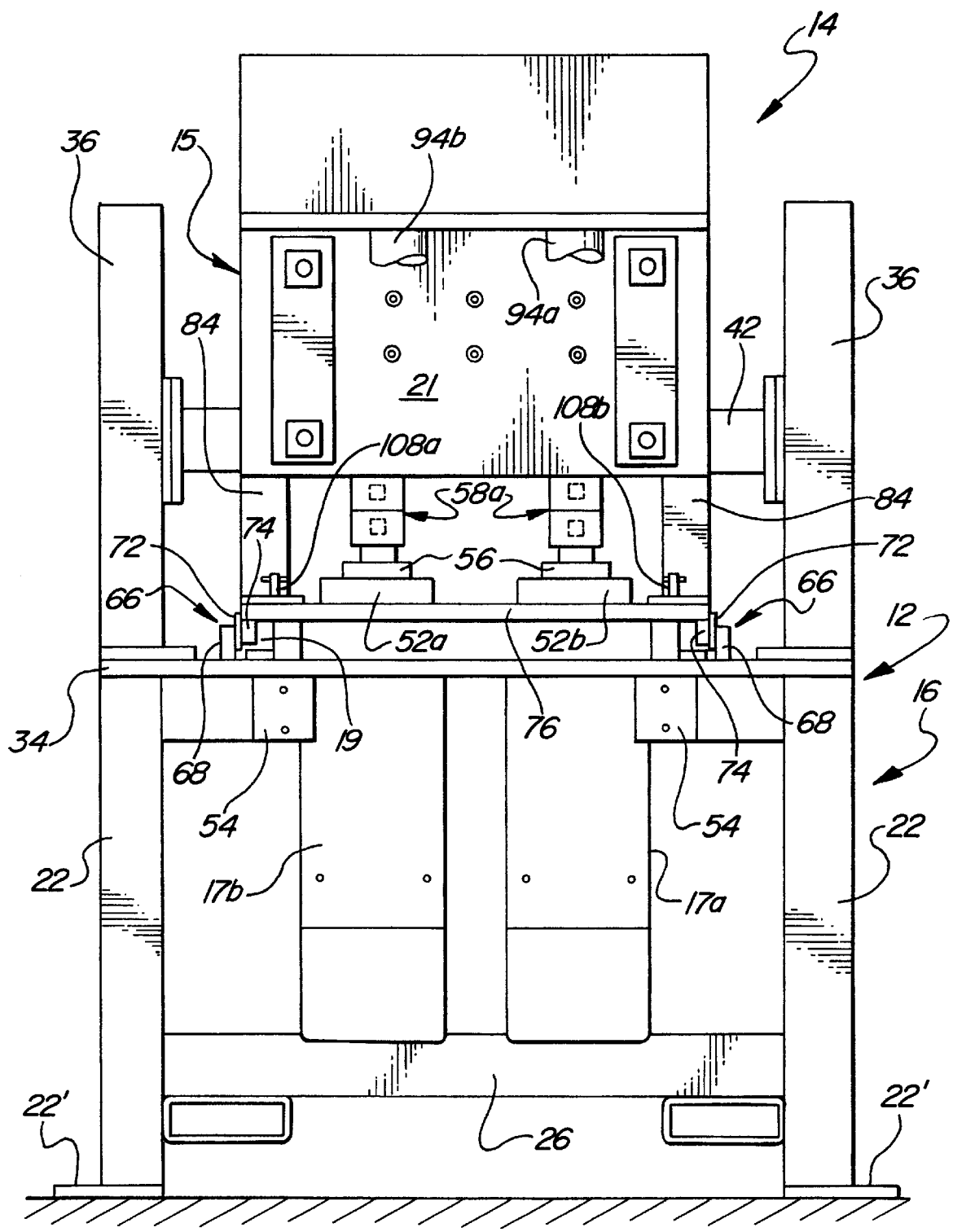
FIG. 4 is a front elevation view of the welding machine with certain parts removed.
Figure 7:
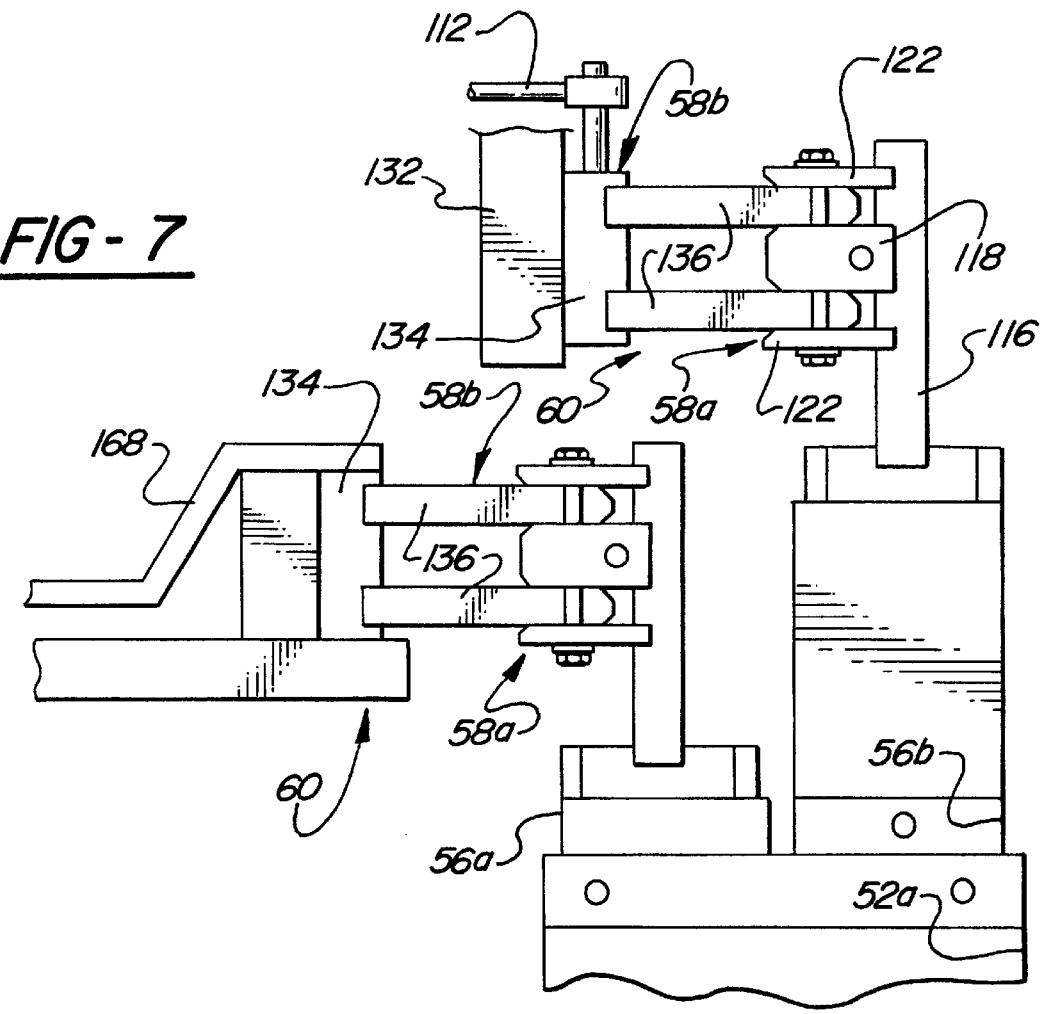
Figure 6:
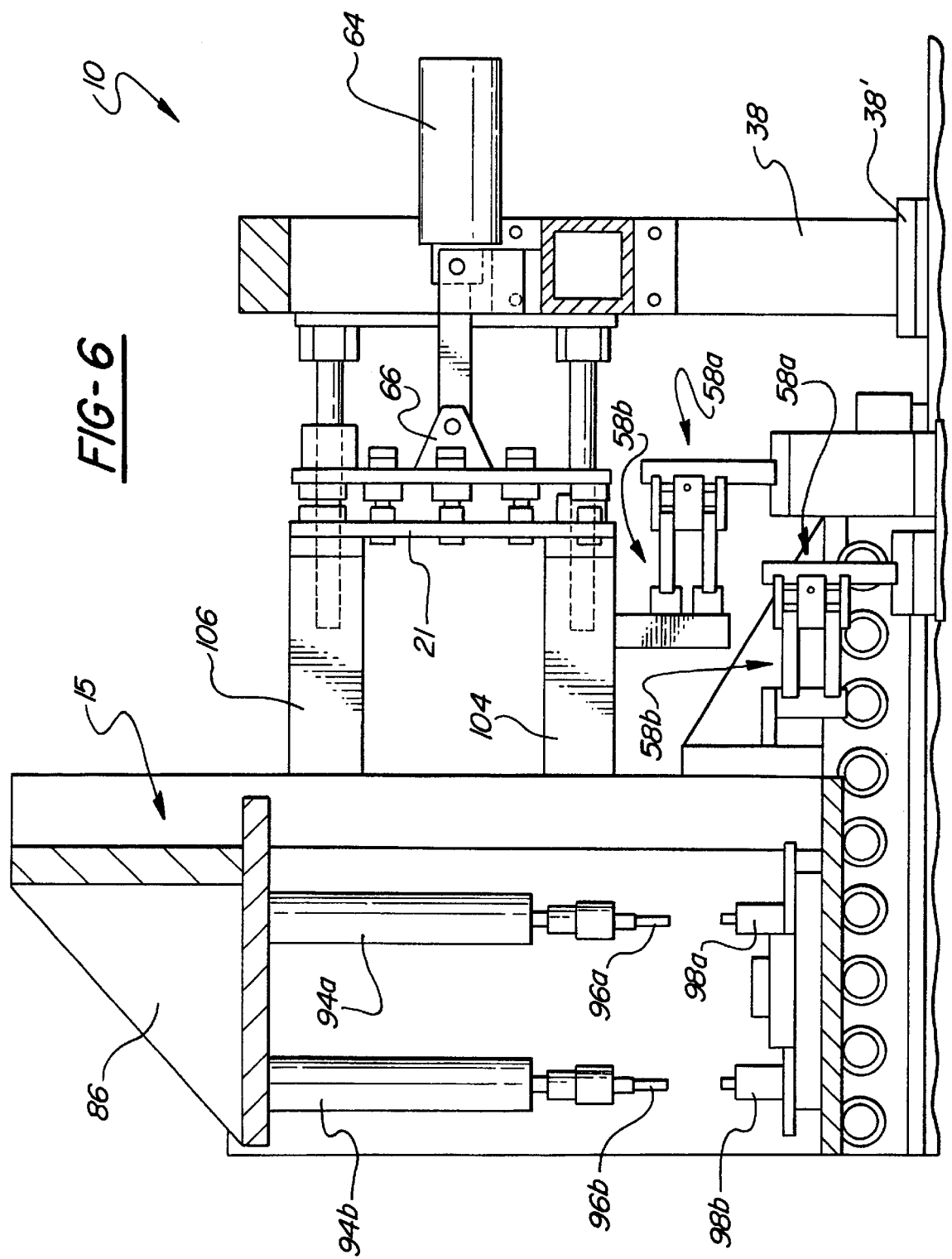
FIG. 6 is an enlarged view of another portion of FIG. 2.

As shown in FIG. 4, the machine frame 16 supports the two welding transformers 17a and 17b. Each transformer is mounted on a frame member by a bracket 54. As shown in FIGS. 2 and 7, each transformer is provided with a pair of secondary terminals 56a and 56b. Each terminal is fitted with a contactor member 58a which is adapted to mate with a complementary contactor member 58b which taken together, constitute a transformer contactor 60. The contactors 60 will be described in greater detail subsequently.

The machine frame 16, as described with reference to FIG. 1 supports a control cabinet 18. The control cabinet includes a controller for the welding machine, preferably a programmable logic controller (PLC). It also contains a weld controller and the power circuits for the welding transformers including the input supply voltage which is connected to the transformer primary winding terminals. In addition to the weld controller, the cabinet contains silicon controlled rectifiers (SCR) for control of the welding current. Further, the cabinet contains the operator interface panel, the weld program selector, manual controls, terminal strips and input/output terminals for control signals and sensor signals. Actuators, such as pneumatic and electrical, are mounted on the machine frame at suitable locations as needed. Solenoid valves (not shown) for control of pneumatic actuators and cooling water are suitably mounted on the machine frame separate from the control cabinet and are connected with the factory supply lines.

Description of the Base Operating Machine

Figure 3:
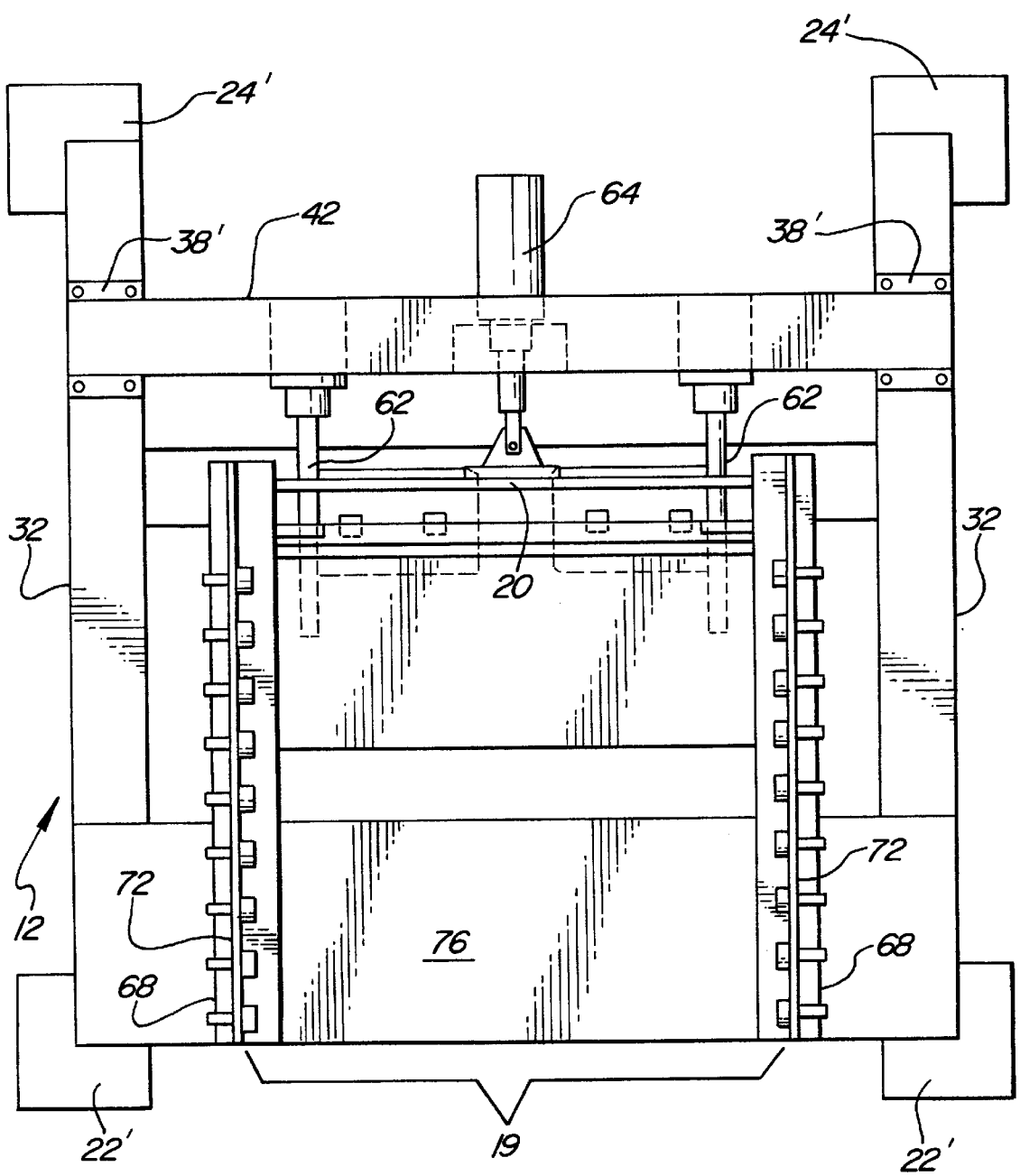
FIG. 3 is a top plan view of the welding machine with certain parts removed.

The base operating machine 12 is shown in side elevation in FIG. 2 with the tooling module 14 installed and it is also shown in FIG. 4 in front elevation with the tooling module 14 installed but with parts broken away. The base operating machine 12 is shown in FIG. 3 in plan view without the tooling module 14 installed. The machine connector plate 20, as shown in FIG. 5, supports a plurality of connectors (to be described below). The connector plate 20 is mounted for horizontal fore and aft movement from a retracted position to an extended position on a set of four guide rods 62 which are fixedly mounted on the support beam 42. In order to maintain alignment of the connector plates 20 and 21 with the module in its installed location, each guide rod 62 extends into a corresponding guide bushing 63 mounted on the module connector plate 21. A pneumatic cylinder 64 is mounted on the support beam 42 and has a piston rod connected with a bracket on the rear of the connector plate 20. The connector plate 20 will be described in greater detail below.

The base operating machine 12 includes a support rack 19 for supporting the tooling module 14 (see FIGS. 2, 3, 4 and 4A). The support rack 19 comprises the table plate 34 and guide means 66. The guide means comprises a pair of rails 68 which extend parallel with each other in the front to rear direction of the machine frame. Each rail 68 includes a flange plate 72 mounted on the inner side of the rail and each rail also includes a plurality of roller bearings 74 having a stationary shaft extending through the flange plate 72 and rail 68 and secured thereto. The rails are spaced apart laterally so that the bottom plate 76 of module 14 (to be described below) is supported on the two sets of rollers and retained in a centered position between the flange plates 72. The rails 68 facilitate the removal and installation of a tooling module in the base operating machine.

Description of the Tooling Module

The tooling module 14 is shown installed on the base operating machine 12 in the side elevation view of FIG. 2. It is shown installed on the base operating machine, with parts broken away, in the front elevation view of FIG. 4. The tooling module 14 comprises the module frame 15 which includes the bottom plate 76 with a pair of vertical posts 84 supported thereon in laterally spaced arrangement. Lower triangular brackets 85 support the vertical posts 84 on the bottom plate 76. The posts 84 together with a triangular brackets 86 support a top plate 88 which is located above the bottom plate 76. The upper tooling is mounted to the top plate 88 and comprises the pair of weld guns 92a and 92b which include weld cylinders 94a and 94b and welding electrodes 96a and 96b, respectively. The lower tooling 4 of the module comprises a pair of electrodes 98a and 98b supported in water cooled bases 102a and 102b which are supported on the bottom plate 76.

The tooling module also includes the module connector plate 21 which is supported on the posts 84 by a lower pair of stand-off arms 104 and an upper pair of stand-off arms 106. The module connector plate 21 will be described in greater detail subsequently.

The tooling module 14 also includes the contactor members 58b which are the male contactor members of the transformer contactors 60 and which are movable with the module frame 15. The contactors 60 were referred to above in the description of the machine frame and the welding transformers 17a and 17b. As shown in FIGS. 2 and 6–12, the male contactor members 58b are fixedly mounted to the tooling module frame 15. The contactor member 58b for the lower tooling 4 is mounted to the triangular bracket 85. This contactor member is electrically connected by a rigid bus bar 108 to the base 102a of the lower tooling 4. Similarly, the contactor member 58b for the upper tooling 2 is mounted to the lower stand-off arm 104 of the module frame. This contactor member 58b is electrically connected by a cable 112 to the electrode 96a of welding gun 92a. It will be understood that the electrodes 96b and 98b are electrically connected to their own contactor members (not shown) in the same manner as described for the electrodes 96a and 98a.

As shown in FIGS. 7–12, each contactor 60 is a plug type contactor adapted for quick connect/disconnect by push/pull action. The contactor member 58a constitutes a socket and comprises a support member 116 with a center contact element 118 mounted thereto. It also comprises a pair of outer contact elements 122 which are constructed as flat plates and are mounted to the support member 116 in spaced parallel relation with the center contact element 118. Each of the outer contact elements 122 forms a channel-shaped space between itself and the center contact element 118. The two outer contact elements 122 are urged toward the contact element 118 by a set of three bolts 124 and nuts 126 (see FIGS. 8 and 9) extending through the side contact elements 112 and the center contact element 118. A belleville washer 128 is disposed under the head 132 of each bolt 124 and another belleville washer 128 is disposed under each nut 126 to provide a spring loading of the outer contact elements 122. Each of the channel-shaped sockets 123a and 123b is adapted to receive a contact blade 136 of the plug contactor member 58b which will be described presently. The socket contact elements 118 and 122 as well as the support member 116 are preferably constructed of copper. The bolts 124 with associated nuts and washers constrain the outer contact elements 122 from moving away from the center contact element 118. The inner edges of the contact elements are beveled or suitably rounded to facilitate the entrance of the plug contact elements into the sockets.

Figure 10:
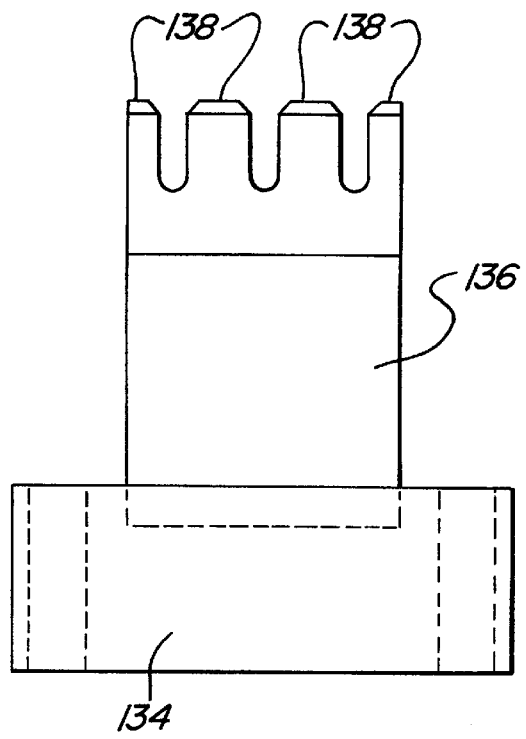
Figure 11:
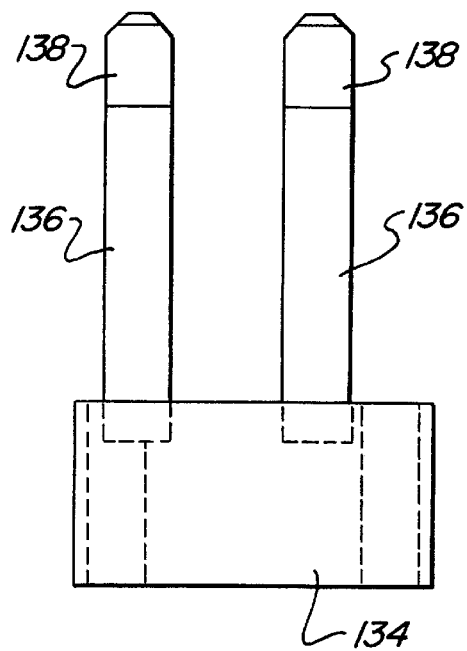
Figure 12:
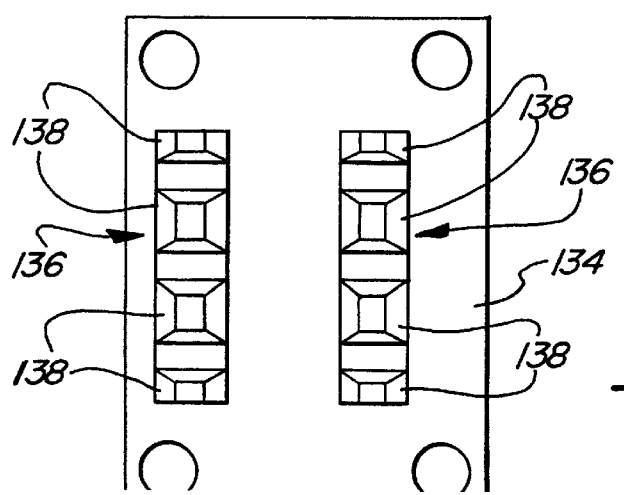

The plug contactor member 58b, as shown on FIGS. 7, 10, 11 and 12, is mounted to an insulating support member 132 which in turn is mounted to the lower stand-off arm 104 of the module frame. A contactor body 134 is mounted to the support member 132 and a pair of contactor blades 136 are mounted to the body 134. Each contactor blade 136 is of rectangular cross-section with oppositely disposed parallel flat faces as best shown in FIGS. 10 and 11. The free ends of the contactor blades are provided with a set of three notches which provides a set of four contact fingers 138 which are spaced apart so as to accommodate the shanks of the three bolts in the socket contactor member 58a. The free ends of the contact fingers 138 are beveled or suitably rounded to facilitate entry into the sockets.

The plug contactor member 58b, being mounted on the module frame, is movable relative to the stationary socket contact member 58a and is disposed in alignment therewith so that linear motion of the tooling module causes insertion or withdrawal of the contactor blades 136 with respect to the contactor sockets 123a and 123b.

The welding current contactors 60, as described above, operate as plug type contactors which make an electrical connection when plugged in and break the electrical connection when unplugged. The contactors are plugged in by the movement of the tooling module 14 from the uninstalled location to the installed location relative to the base operating machine 12. In order for the contactors 60 to be capable of carrying high amperage welding current as required for spot welding, the contactors 60 are provided with contact members which have relatively large area surface-to-surface engagement with a high contact pressure between the surfaces. In the embodiment described above, high contact pressure is provided by the plug and socket arrangement by a close fit of the movable contact member with the fixed contact member together with the belleville washers which serve as force applying means for providing increased contact pressure. Additionally, the relative motion of the movable and fixed contact members when the contactor is plugged in and unplugged causes a rubbing of the contact surfaces which tends to remove oxide and contamination and provide clean metal-to-metal contact to enhance current conduction.

Figure 17A:
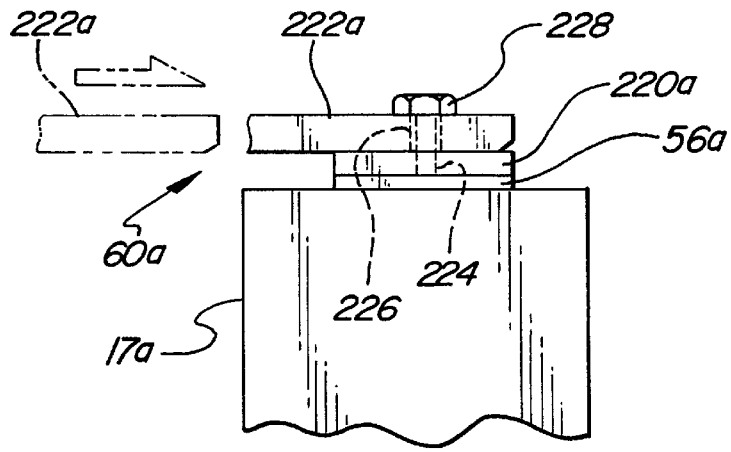
FIGS. 17A, 17B and 17C show alternative electrical contactors which may be used in place of the contactors of FIGS. 7 through 12.

Alternative embodiments of the welding current contactors 60 which are useful in some applications are as follows. FIG. 17A shows a plug type connector 60a with a fixed contactor member 220a and a movable contactor member 222a. The fixed contactor member 220a comprises a copper block mounted on the secondary terminal 56a of the welding transformer 17a. The movable contactor member 222a is a rectangular finger or blade, preferably copper, which is mounted on the frame of the tooling module for movement therewith. The fixed contactor member is provided with a threaded hole 224 and the movable contactor member is provided with a hole 226. When the tooling module is moved into its installed position, as indicated by the phantom arrowhead and contactor member 222*a*, the movable contactor member 222*a* is positioned so that the hole 226 is aligned with the threaded hole 224. A bolt 228 is inserted into the holes and is tightened to achieve a high engagement pressure between the contacting surfaces of the contactor members.

Figure 17B:
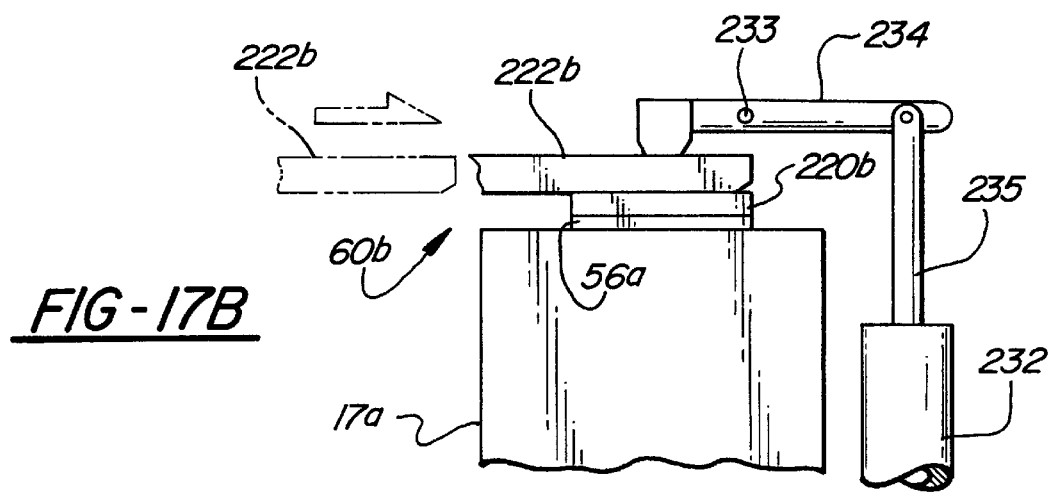

FIG. 17B shows a contactor 60*b* with a fixed contactor member 220*b* and a movable contactor member 222*b*. The movable and fixed contactor members are suitably of the same construction as described with reference to FIG. 17A except that neither member needs to be provided with a hole. A pneumatic actuator 232 is provided to apply a force against the movable contactor member to obtain high engagement pressure between the movable and fixed contactor members. The actuator 232 is mounted on the base operating machine and a pivot arm 234 is supported by a pivot pin 233 on the machine. The pivot arm is connected at one end with the piston rod 235 of the actuator. The other end of the pivot arm, in the open position, is spaced from the fixed contactor member to provide clearance for entry of the movable contactor member. The actuator piston is extended when air pressure is applied and is retracted by a return spring. When the tooling module is moved into its installed location, movable contactor member is positioned between the fixed contactor member and the pivot arm. When the actuator is energized, the arm applies force to obtain the desired contact pressure. The movable contactor member 222*b* may constitute a rigid bus bar constructed as a unitary bar connected to the lower tooling of the welder.

Figure 17C:
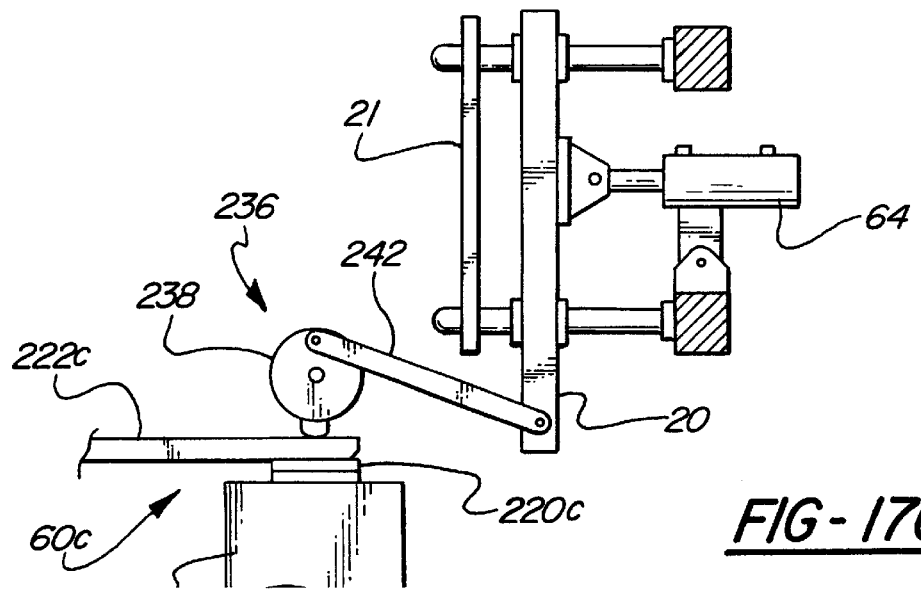
Figure 18:
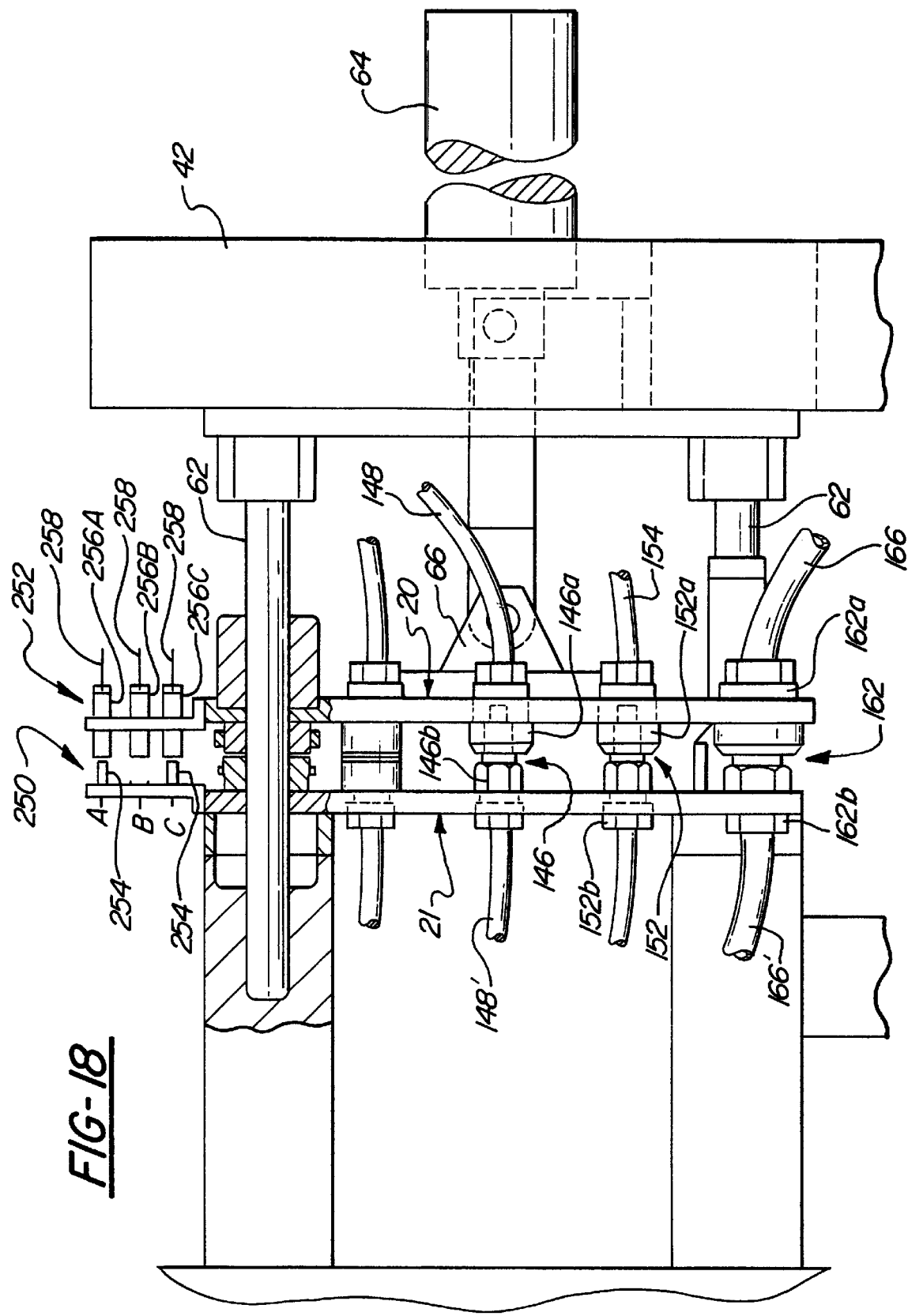
FIG. 18 shows a module coding arrangement for automatic program selection.

FIG. 17C shows a contactor 60*c* with a fixed contactor member 220*c* and a movable contactor member 222*c*. The fixed and movable contactor members are suitably of the same construction as described with reference to FIG. 17F. A cam actuator 236 is provided for applying force to the movable contactor to obtain high contact pressure between the contactor members. The cam actuator includes a cam 238 mounted for rotation about a shaft which is mounted on the frame of the base operating machine. A link 242 is connected between an off-center pivot pin on the cam 238 and a pivot pin on the machine connector plate 20 of the base operating machine. When the tooling module is moved to its installed location, the movable contactor member 222*c* is positioned over the fixed contactor member 220*c*. The cam 238 is located above the movable contactor member 222*c* with clearance from the movable contactor. When the connector plate 20 is actuated by the actuator 64 toward engagement with the module connector plate 21, the cam 238 is rotated and the cam lobe applies a force against the movable contactor to obtain the desired contact pressure.

Description of the Connector Plates

The machine connector plate 20 and the module connector plate 21 will now be described with reference to FIGS. 5 and 5A. As described above, the machine connector plate 20 is mounted for linear movement on guide rods 62 between a retracted position and an extended position whereas the module connector plate 21 is stationary with respect to the frame of the tooling module.

FIG. 5 shows the machine connector plate 20 in its extended position with a set of quick connect/disconnect connector members thereon in mating engagement with corresponding connector members on the module connector plate 21. FIG. 5A is a perspective view of module connector plate 21. Each of the connectors is of the type which makes and breaks connection by linear push and pull motion and its male member may be mounted on either connector plate 20 or 21 with its female member mounted on the other plate.

A multi-pin electrical connector 146 has a male connector member 146*b* mounted on the module connector plate 21 and a female connector member 146*a* mounted on the machine connector plate 20. An electrical cable 148 extends from the connector member 146*a* to its associated terminal strip (not shown) in the control cabinet 18. An electrical cable 148' extends from the connector member 146*b* to associated devices such as sensors on the tooling module. A pneumatic connector 152 includes member 152*a* on the machine connector plate 20 and a mating connector member 152*b* on the module connector plate 21. Additional pneumatic connectors 152 of the same structure are provided as shown. An air pressure supply line 154 is connected from the connector member 152*a* to the associated solenoid valve (not shown) on the machine frame. An air pressure supply line 154' is connected from the connector member 152*b* to the pneumatic cylinder 94*a* of the welding gun 92*a* on the module. A cooling water supply connector 162 includes connector members 162*a* and 162*b*. A cooling water supply line 166 extends to an associated solenoid valve (not shown) on the machine frame. A cooling water return line 166' extends to a cooling water connection on the lower tooling of the tooling module. A cooling water return connector (not shown in FIG. 5) is of the same construction as connector 162.

Description of Other Features

A parts feeder 172 is shown in FIG. 13 for supplying parts from a parts feed mechanism (not shown) on the base operating machine to the tooling module for welding onto a workpiece. The parts feeder comprises a parts input connector member 172 mounted on the top edge of the machine connector plate 20 and a parts output connector member 174 mounted on the top edge of the module connector plate 21 in alignment with the connector member 172. The input connector member 172 includes a movable shuttle 176 which has feeder tubes 178*a* and 178*b* connected thereto and connected to the parts feed mechanism for small parts such as threaded nuts. In this arrangement, two nuts are fed through the tubes 178*a* and 178*b* side-by-side to the shuttle 176. The shuttle is actuated by a linear pneumatic actuator 182 connected by a pneumatic line (not shown) to a solenoid valve on the machine frame. The parts output member 174 is provided with a first set of conveying tubes 184*a* and 184*b* and a second set of conveying tubes 184*c* and 184*d* which extend to specific locations on the workpiece for welding. The shuttle 182 is programmed to switch between the first and second set of conveying tubes in accordance with the requirements of to the workpiece being processed.

Figure 4A:
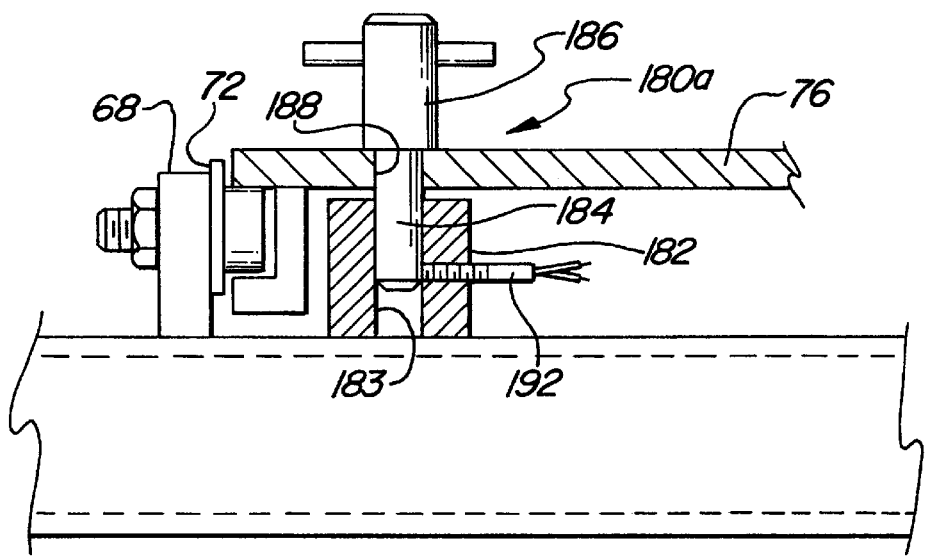
FIG. 4A shows an interlock and sensor for the tool module.

In order to ensure that the tooling module 14 is installed to its proper position a mechanical and electrical interlock system is provided, as shown in FIGS. 4 and 4A. Two interlock units 180*a* and 180*b* are provided with one on each side of the support rack 19. The two units are identical and provide both mechanical and electrical interlocking. The description will be given with reference to interlock 180*a*. The mechanical interlock comprises an index block 182 which is secured to the table plate 34 on the machine frame and has a circular passage which extends vertically through the block from the top surface. A stop pin 184 with a handle 186 extends through an opening 188 in the bottom plate 76 of the tooling module 14. The opening 188 is positioned on the plate 76 so that it is in alignment with the passage 183 in the block 182 when the tooling module is in its installed position in the tooling support rack 19. The electrical interlock comprises a proximity sensor 192 which extends laterally through the index block 182 to a position adjacent the free end of the pin 184 when the pin is fully inserted into the passage 183. The sensor 192 is electrically connected through its associated connector member 146b in the module connector plate 21 and the connector member 146a on the machine connector plate 20 to the PLC in the control cabinet. When the sensor 192 detects the presence of the lock pin 184 in the locking position, an enabling signal is generated which allows operation of the welder to commence.

Figure 15:
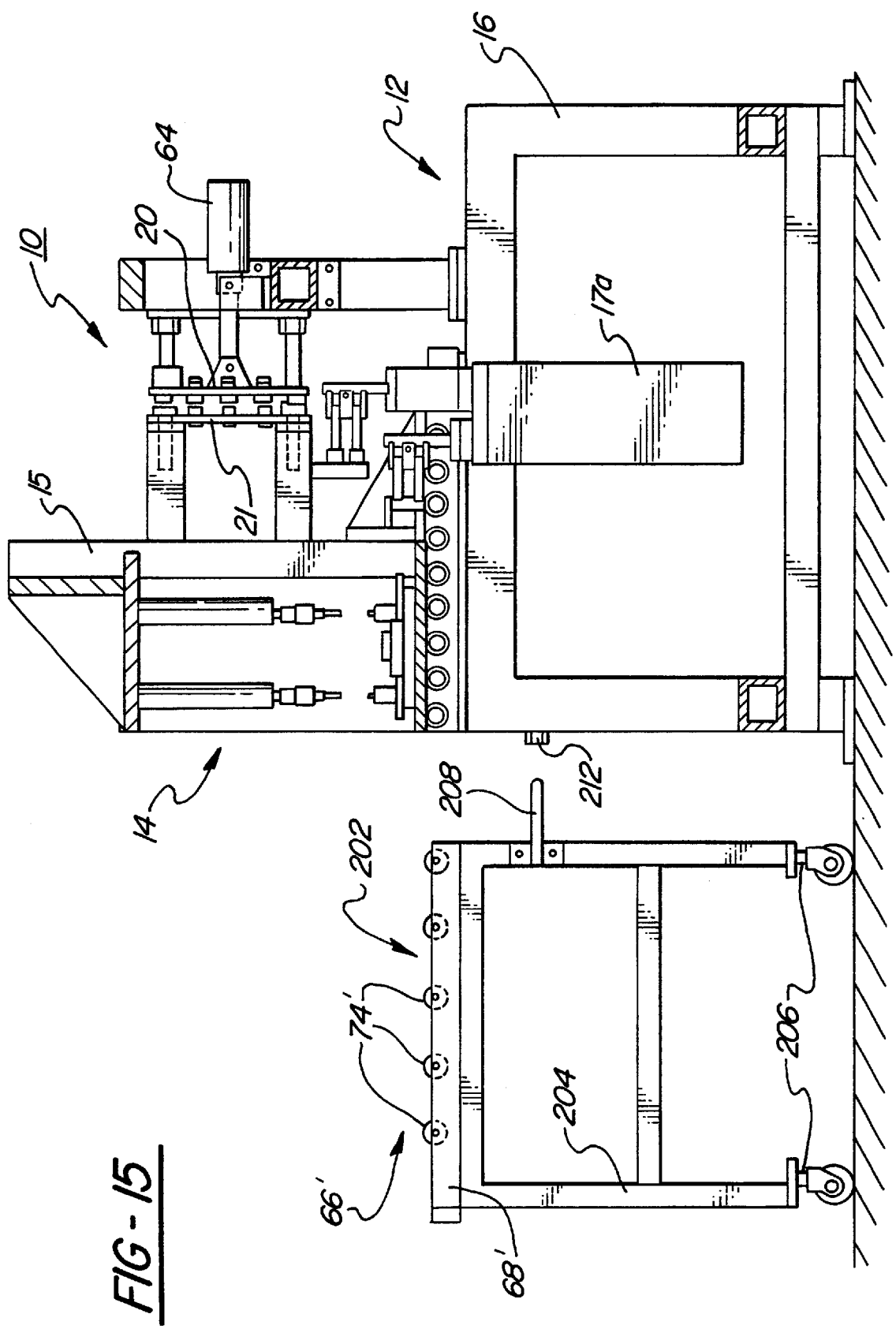
FIG. 15 is a side elevation view of a module cart for loading a tooling module into the welding machine.
Figure 16:
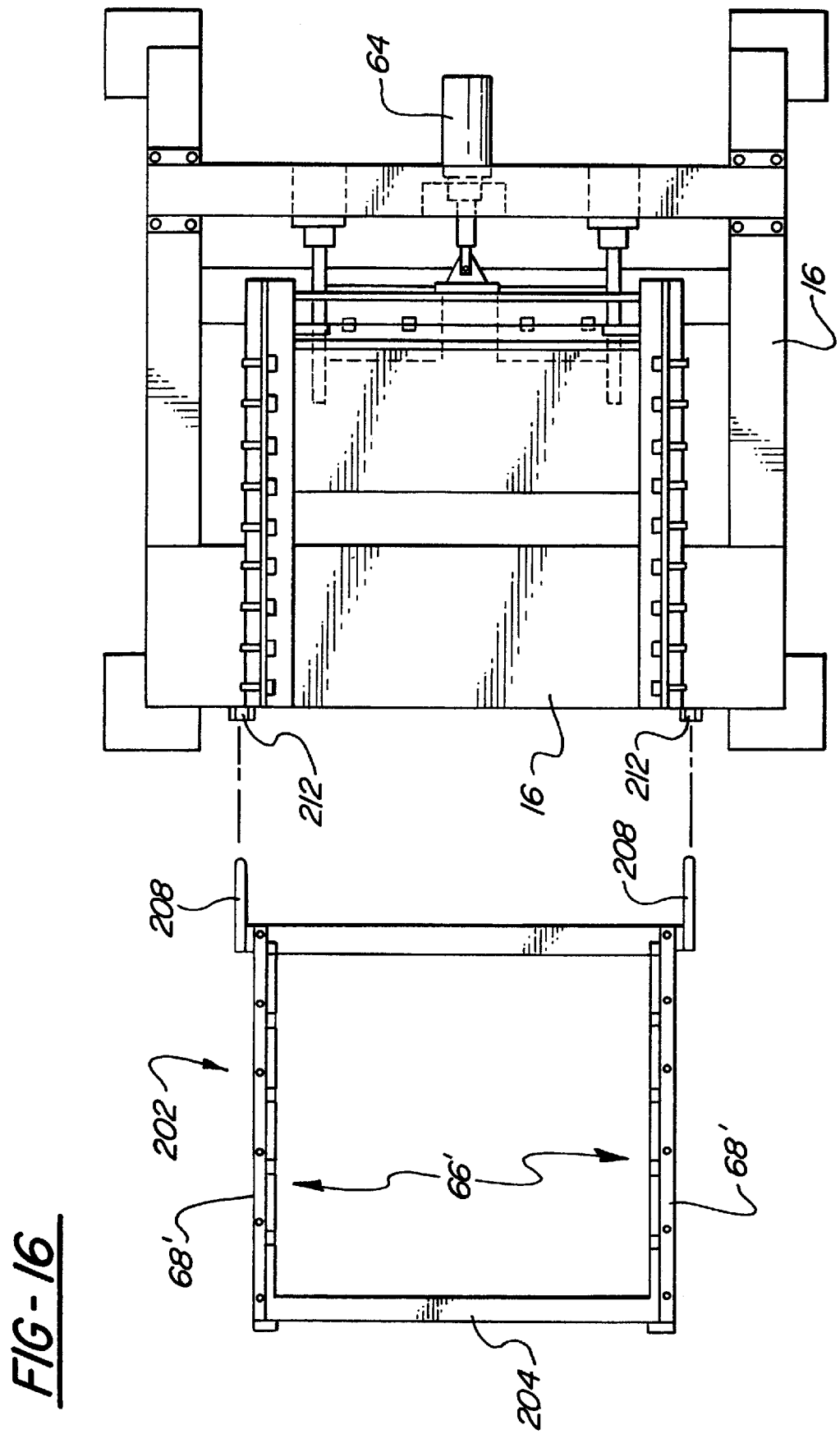
FIG. 16 is a top plan view of the module cart of FIG. 15.

In order to facilitate the installation and removal of the tooling module 14 from the base operating machine 12, a module transfer cart 202 is provided as shown in FIGS. 15 and 16. The cart comprises a rectangular frame 204 which is mounted on a set of casters 206. For supporting the tooling module on the cart, a guide means 66' which comprises rails 68', side plates and roller bearings 74' mounted on the top of the frame 204 in the same manner as described with reference to the guide means 66 in the support rack 19. The forward end of the cart 202 is provided with a pair of alignment pins 208 which extend forwardly from the front of the cart frame 204. A pair of alignment sockets 212 are disposed on the machine frame 16 which are aligned for coaction with the pins 208 when the cart is positioned so that the guide rails 68' on the cart are in alignment with the guide rails 68 on the support rack 19. When the cart 202 is positioned so that the pins 208 are fully inserted into the sockets 212, the tooling module 14 is manually pushed off the cart onto the support rack on the base operating machine to the installed position. In this location, each of the male weld current contactor members 58b are fully inserted into the female contactor members 58a.

Since each tooling module operates under program control provided by the programmable logic controller (PLC), a stored computer program is provided in the PLC corresponding to each different tooling module. When a module is installed in the base operating machine, the program for running the module may be manually selected by the operator by the program selector in the control cabinet. However, in order to avoid the possibility of human error and to provide automatic program selection, it is desirable to make each tooling module a "smart" module. This feature of the invention will now be described.

As shown in FIG. 19, a code storage device 250 is mounted on the module connector plate 21 and a code reader 252 is mounted on the machine connector plate 20 opposite the code storage device. The code storage device is adapted to store a binary coded number which uniquely identifies the tooling module on which it is mounted and it also identifies a computer program stored in the memory of the programmable logic controller in the control cabinet 18. The stored computer program corresponding to the installed tooling module is designed to control the operation of the welding machine for running a particular production job. It will be understood that there are a plurality of tooling modules 14 for each base operating machine 12 and, as described above, each tooling module is useful for a particular production job. Accordingly, the memory of the programmable logic controller stores a plurality of computer programs, for example, one program for each different tooling module.

The code storage device 250 in the illustrative embodiment comprises three binary element positions a, b and c which may or may not be occupied by a binary element 254. As shown, there is a binary element 254 in positions a and c and an absence of binary element in position b. Thus, the code storage device can be used to represent any one of the digital numbers 0 through 7. The binary elements 254 are of rod-like structure and may be of ferrous metal. The code reader 252 comprises a set of three proximity sensors 256a, 256b and 256c which are disposed opposite the positions a, b and c, respectively, of the code storage device 250. Each of the proximity detectors is a switch which is turned on when the end of the detector is in close proximity to a binary element and is turned off in the absence of such proximity. A conductor 258 is connected between each proximity sensor and an input pin of the programmable logic controller. The controller reads the code number of the installed tooling module 14 and calls up the corresponding computer program to provide program control of the welding machine with the installed tooling module. When it is desired to run a different production job, the installed module is removed from the base operating machine and a different module is installed. Upon installation of the replacement tooling module, the code reader 252 will read the code storage device 250 and the code number thereof will be sensed by the programmable logic controller. The controller will call up the corresponding computer program for running the newly installed tooling module.

Schematic Diagram of the Welding Machine

FIG. 20 shows the welding machine of this invention in a schematic diagram. The base operating machine 12 is represented within the dashed line rectangle 12' and the tooling module 14 is represented within the dashed line rectangle 14'. In the interest of clarity, the connections for only a single welding gun are shown in the diagram. The respective frames of the base operating machine and the tooling module are shown as cross-hatched members, it being understood that the frame of the module is separate from the base operating machine, as described above.

The base operating machine as previously described comprises the control cabinet 18 and a set of solenoid valves 150 for on/off control of the pneumatic pressure for actuators and cooling water supply for the welder. The base operating machine also includes a welding transformer 17 for each welding gun of the tooling modules which are to be used with the base operating machine. The base operating machine also includes the machine connector plate 20 which is movable relative to the frame of the base operating machine, by means of the pneumatic cylinder 64, between the retracted position shown and the extended position.

The tooling module 14 is illustrated in FIG. 20 as being in the installed position with reference to the base operating machine 12. In this installed position, the lower and upper contactors 60 are both operatively engaged for connecting the secondary terminals of the transformer 17 with the lower and upper tooling, respectively. When the tooling module is in the installed position, the connector plate 19 of the module is disposed opposite the connector plate 20 of the machine, however, the connector members carried by the respective plates are not operatively engaged with each other until the connector plate 20 is moved from the retracted position to the extended position. This is obtained by energizing the pneumatic cylinder 64 through its solenoid valve. With the connectors in the engaged position, the interlock sensor 192 is connected through mating pins of the electrical connector 146 with the PLC in the control cabinet and the machine is enabled for operation. Other sensor signals and control signals may be sent through other pins of this connector, as desired. The pneumatic connectors 152 and 154 are also operatively engaged and are effective to supply air pressure through the lines 156 and 158 from respective solenoid valves and through lines 156' and 158' to the actuator of the welding gun 98a. The cooling water connectors 162 and 164 are also operatively engaged for supplying cooling water through supply and return lines 166 and 168 to the respective solenoid valves and through lines 166' and 168' to the lower tooling 4 of the module. With the modular connector plate 19 operatively connected with the machine connector plate 20, the welding machine is in readiness for welding operations.

Although the description of this invention has been given with reference to a particular embodiment, it is not to be construed in a limiting sense. Many variations and modifications will now occur to those skilled in the art. For a definition of the invention, reference is made to the appended claims.

What is claimed is:

1. A welding machine comprising:
   a machine frame,
   a tooling module having a module frame and being movable between an un-installed and installed location relative to said machine frame,
   a welding transformer mounted on said machine frame, said transformer having a pair of primary terminals and a pair of secondary terminals,
   said tooling module including tooling for electric welding and including a module connector plate,
   a machine connector plate mounted on said machine frame and having a first connector member mounted thereon,
   said module connector plate having second connector member mounted thereon,
   first and second fixed contactor members which are fixed relative to said machine frame and connected, respectively, to said pair of secondary terminals,
   first and second movable contactor members which are mounted on said module frame for movement therewith and electrically connected with said tooling,
   said first and second movable contactor members being operably connected, respectively, with said first and second fixed contactor members when said tooling module is in said installed location,
   guide means for guided movement of said tooling module on said machine frame between said un-installed and installed locations,
   said module connector plate being located in alignment with said machine connector plate when said tooling module is in said installed location,
   and an actuator for moving said machine connector plate toward said module connector plate with said module in said installed location for operative engagement of said first and second connector members.

2. The welding machine as defined in claim 1 including:
   a first alignment member mounted on said machine connector plate and a second alignment member mounted on said module connector plate,
   said first and second alignment members coacting with each other when said tooling module is in the installed position to hold said connector plates in predetermined alignment with each other.

3. The welding machine as defined in claim 2 wherein said machine connector plate includes a plurality of first alignment members mounted thereon and said module connector plate includes a plurality of second alignment members mounted thereon,
   each of said first alignment members being mated with one of said second alignment members when said machine connector plate is moved from said retracted position to said extended position.

4. The welding machine as defined in claim 3 wherein said first alignment members are pins and said second alignment members are bushings.

5. The welding machine as defined in claim 1 wherein said machine connector plate is mounted for reciprocal motion on said machine frame, and includes:
   an actuator connected with said machine connector plate for moving said machine connector plate from a retracted position to an extended position when said tooling module is in the installed position for engaging said first and second connector members.

6. The welding machine as defined in claim 5 wherein said machine connector plate has a plurality of first connector members mounted thereon and said module connector plate has a plurality of second connector members mounted thereon,
   each of said first connector members being adapted to mate with a corresponding one of said second connector members to establish an operative connection therebetween when said machine connector plate is moved from said retracted position to said extended position.

7. The welding machine as defined in claim 6 wherein a selected number of said first and second connector members constitute fluid pressure connectors and a selected number of said first and second connector members constitute electrical connectors.

8. The welding machine as defined in claim 5 including:
   a first parts-feed connector member mounted on said machine connector plate,
   a second parts-feed connector member mounted on said module connector plate,
   said first and second parts-feed connector members being coupled for coacting with each other when said machine connector plate is moved from said retracted position to said extended position.

9. The welding machine as defined in claim 8 wherein said second parts-feed connector member comprises plural conduit paths for conveying parts and said first parts-feed connector member comprises a shuttle for switching the connection of the input conduit from one output conduit to the other.

10. The welding machine as defined in claim 1 wherein said guide means comprises:
    a track means on said machine frame and a track follower means on said tooling module frame for moving said module between said uninstalled location and said installed locations.

11. The welding machine as defined in claim 10 including:
    indexing means comprising a first element fixedly mounted on said machine frame and a second element movably mounted on said module frame for engagement of said elements with each other when said module is in said installed location.

12. The welding machine as defined in claim 11 wherein said first element comprises a pin and said second element comprises a socket for receiving said pin.

13. The welding machine as defined in claim 11 including a sensor mounted on said machine frame for detecting the engagement of said elements for providing a signal indicating the location of said module in said installed location.

14. The welding machine as defined in claim 1 wherein:
    said guide means comprises a pair of spaced apart tracks disposed parallel to each other on said machine frame, a set of rollers mounted on each of said tracks for movement of said module between said un-installed location and said installed locations.

15. The welding machine as defined in claim 1 including:
a tool cart for transferring said tooling module to said machine frame,
guide means on said tool cart for receiving said tooling module and for moving said module between said guide means one said tool cart and said guide means on said machine frame.

16. The welding machine as defined in claim 15 including:
a first alignment member on said cart,
a second alignment member on said machine frame,
said first and second alignment members coacting to hold said guide means on said cart in alignment with said guide means on said machine frame.

17. A welding machine comprising:
a machine frame,
a welding transformer and control means mounted on said machine frame,
a tooling module having a module frame and being movable as a unit between an uninstalled and installed location relative to said machine frame,
said tooling module including upper and lower tooling for electric welding and a module connector plate mounted thereon,
a machine connector plate mounted on said machine frame and having a set of first connector members mounted thereon,
said module connector plate having a set of second electrical connector members mounted thereon,
said machine connector plate having an unplugged position in which said first connector members are not operably connected with said second connector members and having a plugged-in position in which said first connector members are operatively connected with said second connector members,
a first lower tooling contactor member and a first upper tooling contactor member which are fixed relative to said machine frame and which are electrically connected with different terminals of said transformer,
a second lower tooling contactor member and a second upper tooling contactor member which are mounted on said module frame and electrically connected with said lower and upper tooling, respectively,
said first lower and first upper tooling contactor members being operably connected, respectively, with said second lower and said second upper contactor members when said tooling module is in said installed location,
said machine connector plate being in said unplugged position when said tooling module is in said installed position,
an actuator connected with said machine connector plate for moving said machine connector plate from a retracted position to an extended position when said tooling module is in the installed location for operatively connecting said first and second connector members,
and guide means for guiding movement of said tooling module on said machine frame between said un-installed and installed locations.

18. A welding machine comprising:
a base operating machine including a machine frame and a welding transformer fixedly mounted on said machine frame, said transformer having a pair of secondary terminals,
a tooling module including tooling for electric welding,
first and second fixed contactor members in a fixed position on said machine frame and connected, respectively, to said pair of secondary terminals,
first and second movable contactor members which are fixedly mounted relative to said module frame for movement therewith and electrically connected with said tooling module,
guide means on said machine frame and follower means on said tooling module for moving said tooling module between an uninstalled location relative to said machine frame and an installed location relative to said machine frame,
said first and second fixed contactor members being located relative to said guide means on said machine frame and said first and second movable contactor members being mounted on said module relative to said follower means so that said first and second movable contactor members on said module frame are in alignment for mating engagement with said first and second fixed contactor members when said follower means is in engagement with said guide means whereby said first and second movable contactor members are operably connected, respectively, with said first and second fixed contactor members when said tooling module is moved along said guide means to the installed location from said uninstalled location.

19. The welding machine as defined in claim 18 wherein:
each said movable contactor member is aligned with its corresponding fixed contactor member so that said mating engagement causes rubbing contact therebetween when said tooling module is moved into said installed location.

20. The welding machine as defined in claim 19 including:
force applying means for forcing each said movable contactor member into surface-to-surface engagement with its corresponding fixed contactor member when said tooling module is in said installed location.

21. The welding machine as defined in claim 20 wherein:
said force applying means is a bolt.

22. The welding machine as defined in claim 20 wherein:
said force applying means is a fluid pressure actuator.

23. The welding machine as defined in claim 20 wherein:
said force applying means is a cam mechanism actuated by motion of said module.

24. The welding machine as defined in claim 18 including:
force applying means for forcing each said movable contactor member into surface-to-surface engagement with its corresponding fixed contactor member when said tooling module is in said installed location.

25. The welding machine as defined in claim 24 wherein:
said force applying means is a bolt.

26. The welding machine as defined in claim 24 wherein:
said force apply means is a fluid pressure actuator.

27. The welding machine as defined in claim 24 wherein:
said force applying means is a cam mechanism actuated by motion of said module.

28. The welding machine as defined in claim 18 wherein:
a second welding transformer is fixedly mounted on said machine frame, said transformer having a pair of secondary terminals,
a second set of first and second contactor members in a fixed position on said machine frame and connected, respectively, to said pair of secondary terminals on said second transformer, a second set of movable first and second contact members which are fixedly mounted relative to said module frame for movement therewith and electrically connected with said tooling module, and said tooling module includes two sets of welding electrodes, whereby a separate transformer is connected with each set of welding electrodes.

29. A welding machine comprising:

a base operating machine including a machine frame, a welding transformer, a programmable logic controller, and a machine connector plate, said machine connector plate having a set of first connector members mounted thereon, a plurality of tooling modules each having a module frame with welding tooling mounted on the module frame, said tooling module being movable as a unit between an uninstalled and an installed location relative to said base operating machine, electrical contactors for electrically connecting said welding transformer to said welding tooling when said tooling module is in said installed location, a machine connector plate mounted on said machine frame and having a set of first connector members mounted thereon, a tooling module connector plate mounted on said module frame and having a set of second electrical connector members mounted thereon, means for moving said machine connector plate from a retracted position to an extended position when said tooling module is in the installed location for operatively connecting said first and second sets of connector members, guide means for guiding movement of said tooling module on said machine frame between said uninstalled and installed locations, a plurality of module control programs stored in said programmable logic controller each of which is usable for controlling one of said tooling modules, each of said tooling modules having a code storage device thereon with stored code which uniquely identifies one of said module control programs, and a code reader on said base operating machine coacting with said code storage device for reading the code stored therein when said tooling module is in said installed location, said code reading device being electrically coupled with said programmable logic controller whereby the tooling module in the installed location may be operated under the control of the program identified by code stored in said storage device on such module.

30. The welding machine as defined in claim 29 wherein:

said code storage device comprises a set of binary code elements representing a predetermined binary number, said code reader comprises means responsive to said binary elements for producing a signal representing said binary number.

* * * * *